United States Patent
Lee

(10) Patent No.: US 9,213,673 B2
(45) Date of Paten: Dec. 15, 2015

(54) NETWORKED APPLICATIONS WITH CLIENT-CACHING OF EXECUTABLE MODULES

(71) Applicant: VIA Technologies, Inc., Hsin-Tien, Taipei (TW)

(72) Inventor: John K. Lee, Los Altos Hills, CA (US)

(73) Assignee: VIA TECHNOLOGIES, INC., Taipei (TW)

( * ) Notice: Subject to any disclaimer, the term of this patent is extended or adjusted under 35 U.S.C. 154(b) by 274 days.

(21) Appl. No.: 13/772,456

(22) Filed: Feb. 21, 2013

(65) Prior Publication Data
US 2013/0226997 A1    Aug. 29, 2013

Related U.S. Application Data

(60) Provisional application No. 61/602,216, filed on Feb. 23, 2012.

(51) Int. Cl.
| | |
|---|---|
| G06F 15/16 | (2006.01) |
| G06F 15/167 | (2006.01) |
| H04L 29/08 | (2006.01) |
| G06F 9/48 | (2006.01) |

(52) U.S. Cl.
CPC .......... *G06F 15/167* (2013.01); *G06F 9/4843* (2013.01); *H04L 67/2842* (2013.01); *H04L 67/34* (2013.01)

(58) Field of Classification Search
CPC ............... H04L 67/28; H04L 67/2842; H04L 29/08846; H04L 67/34; H04L 67/10; G06F 8/61; G06F 17/30902
USPC .................. 711/118, 126; 717/178, 173, 177
See application file for complete search history.

(56) References Cited

U.S. PATENT DOCUMENTS

| | | | | |
|---|---|---|---|---|
| 8,495,625 | B1* | 7/2013 | Sanders | 717/177 |
| 8,863,116 | B1* | 10/2014 | McCarten et al. | 717/178 |
| 2001/0037399 | A1* | 11/2001 | Eylon et al. | 709/231 |
| 2004/0230971 | A1* | 11/2004 | Rachman et al. | 717/175 |
| 2008/0104195 | A1* | 5/2008 | Hawkins et al. | 709/217 |
| 2008/0178298 | A1* | 7/2008 | Arai et al. | 726/29 |
| 2008/0228772 | A1* | 9/2008 | Plamondon | 707/10 |
| 2009/0063619 | A1* | 3/2009 | Chijiiwa | 709/203 |
| 2009/0288166 | A1* | 11/2009 | Brown et al. | 726/23 |
| 2010/0333085 | A1* | 12/2010 | Criddle et al. | 717/178 |
| 2011/0161403 | A1* | 6/2011 | Fu | 709/203 |
| 2011/0276661 | A1* | 11/2011 | Gujarathi et al. | 709/219 |
| 2012/0110118 | A1* | 5/2012 | Luna et al. | 709/217 |
| 2012/0158819 | A1* | 6/2012 | Anderson et al. | 709/202 |

\* cited by examiner

*Primary Examiner* — Brian J Gillis
*Assistant Examiner* — Kamran Mohammadi
(74) *Attorney, Agent, or Firm* — McClure, Qualey & Rodack, LLP

(57) ABSTRACT

Disclosed are various embodiments for providing networked applications that are segmented into multiple client-cached executable modules. Multiple networked applications are provided by an application server, and a module cache is maintained in a client. The client obtains a user invocation of a particular functionality associated with a networked application. One of the modules associated with the particular functionality is obtained by the client from the application server over a network in response to determining that the module is not already in the module cache. The module is executed by the client to provide the particular functionality. A data cache may be implemented that includes data blocks that have been used, are being used, or are predicted to be used by the networked application.

22 Claims, 9 Drawing Sheets

NETWORKED APPLICATIONS WITH CLIENT-CACHING OF EXECUTABLE MODULES

CROSS-REFERENCE TO RELATED APPLICATION

This application claims priority to, and the benefit of, U.S. Provisional Patent Application entitled, "Networked Applications with Client-Caching of Executable Modules," having Ser. No. 61/602,216, filed on Feb. 23, 2012, which is incorporated by reference in its entirety.

BACKGROUND

In the early days of computing, the mainframe computing architecture was commonplace. With the mainframe computing architecture, a mainframe computer is shared by many client users. The user connects to the mainframe computer by way of a terminal. The terminal provides only simple input and output functions in order for the user to interact with the mainframe computer. Applications are stored in and are executed by the mainframe computer, and all application data is resident on the mainframe computer. Such a system has performance scalability problems since all users share the same hardware. Also, the connection between the terminal and the mainframe computer needs to be active and available to allow use of the system.

With the introduction of the personal computer, execution of system and application software completely shifted to the client side. In addition, application data is also stored by the client. Instead of the mainframe computer providing a virtualized environment for each user, the user actually owns and operates a distinct computing environment. A connection between the client and the server is no longer required for use of applications. Servers are instead used primarily to store and share data. This gives the user much more independence and faster user interface performance. Moreover, a personal computer does not suffer the performance problems of mainframe computers created by shared resources and required network connectivity.

SUMMARY

Briefly described, one embodiment, among others, is a system that comprises at least one computing device and an application server executable by the at least one computing device. The application server comprises logic that maintains an inventory of a plurality of applications, each one of the applications being segmented into a plurality of client-executable modules, wherein a distinct functionality for the one of the applications corresponds to at least one client-executable module corresponding to. The application server further comprises logic that obtains a first request over a network for a first one of the client-executable modules of a first one of the applications from a client and logic that sends the first one of the client-executable modules to the client over the network in response to the first request. Each one of the client-executable modules is configured such that, when the one of the client-executable modules has been stored by a cache of the client, the distinct functionality corresponding to the one of the client-executable modules remains usable in the client despite a loss of connectivity to the server.

Another embodiment is a method that comprises maintaining, by a computing device, a module cache; obtaining, by the computing device, a user invocation of a particular functionality associated with a networked application, the networked application being segmented into a plurality of modules, each of the modules implementing a distinct functionality for the networked application; and determining, by the computing device, whether a first one of the modules is in the module cache, the first one of the modules implementing the particular functionality. The method further comprises obtaining, by the computing device, the first one of the modules from an application server over a network in response to determining that the first one of the modules is not in the module cache and executing, by the computing device, the first one of the modules to provide the particular functionality.

Another embodiment is a non-transitory computer-readable medium embodying a program executable by a computing device. The program comprises code that generates a user interface facilitating user selection from a plurality of networked applications hosted by an application server and code that obtains a user selection of one of the networked applications, wherein the one of the networked applications is segmented into a plurality of client-executable modules that each provides a distinct functionality. The program further comprises code that determines a first set of the client-executable modules which are necessary to provide an initial functionality for the one of the networked applications, code that determines whether the first set of the client-executable modules are present in a client module cache, and code that obtains a first one of the first set of the client-executable modules from the application server in response to determining that the first one of the first set of the client-executable modules is not present in the client module cache. The program further comprises code that loads a second one of the first set of the client-executable modules from the client module cache in response to determining that the second one of the first set of the client-executable modules is present in the client module cache and code that executes the first set of the client-executable modules to provide the initial functionality, wherein the initial functionality is provided irrespective of a network connectivity of the computing device to the application server.

Another embodiment is a system that comprises a computing device and a client executable by the computing device. The client comprises logic that obtains a user selection of one of a plurality of networked applications hosted by an application server, wherein the one of the networked applications is segmented into a plurality of client-executable modules that each provides a distinct functionality. The client further comprises logic that determines a first set of the client-executable modules for providing an initial functionality for the one of the networked applications, logic that obtains the first set of the client-executable modules from the application server based on whether the first set is available in a client module cache in the computing device, and logic that executes the first set of the client-executable modules to provide the initial functionality.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
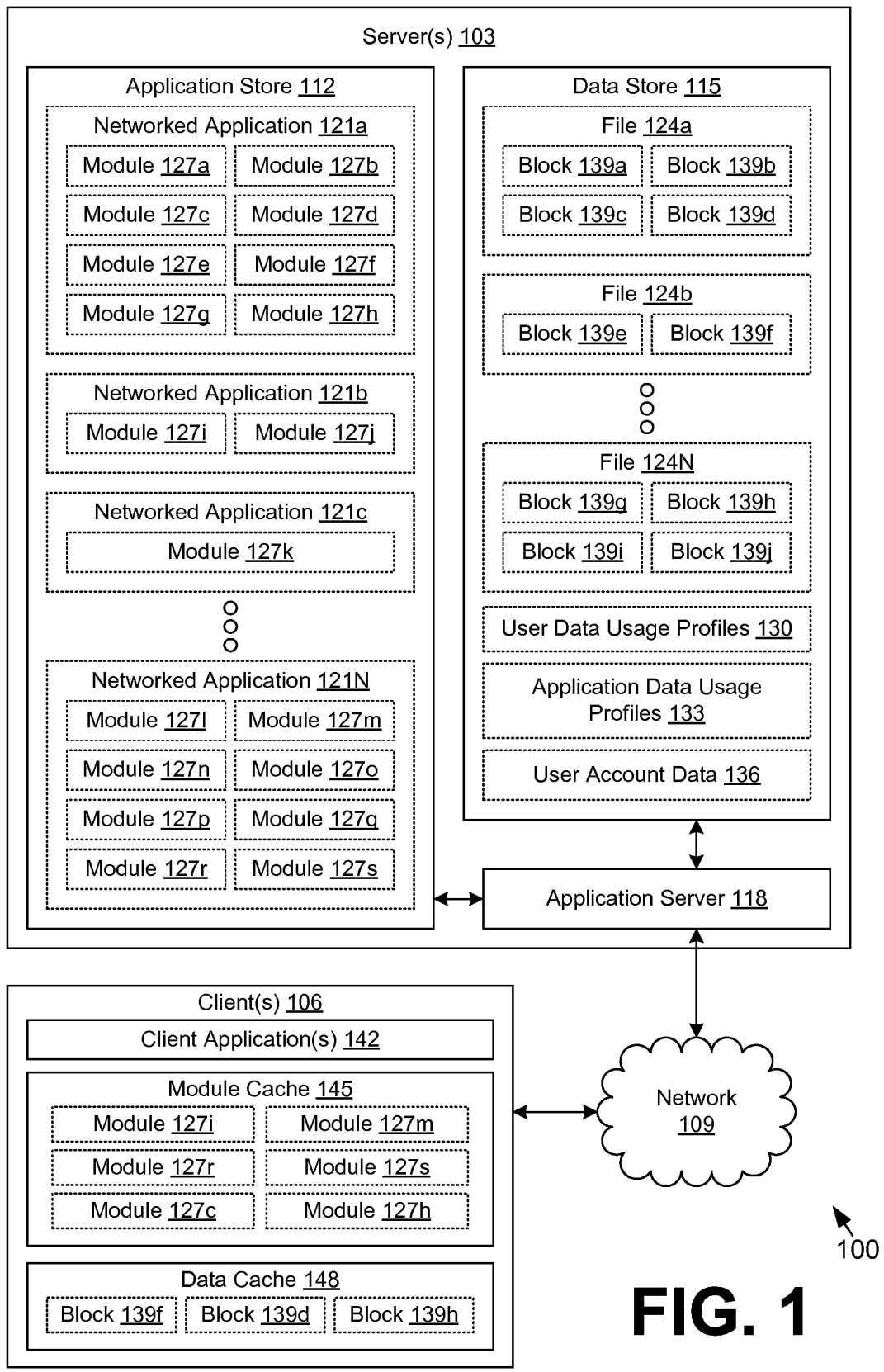
FIG. 1 is a drawing of a networked environment according to various embodiments of the present disclosure.

The present disclosure relates to networked applications with client-caching of executable modules. There has been a shift in recent years towards on-line or networked applications, which may be provided free or subject to paid subscriptions, pay-per-use, pay-to-use, or other arrangements. These may be web server-based applications such as, for example, web-based searches, web-based email, web-based office applications, and others. The access to such applications is typically by way of a browser executed by the client. The browser acts as a user interface and a communication port. This is reminiscent of using a terminal device to remotely access the services of a mainframe computer. Therefore, this use of networked applications suffers from the same problems of mainframe computing systems. Such problems may include, for example, loss of network connectivity preventing use of the system, overload delays at the server, performance problems with the network connection, security and privacy issues arising from using a server at a publicly accessible remote location, and so on.

Remote data and local data are typically managed by the user manually in such systems. If the remote data is not manually copied to the local client, what the user has been using remotely will suddenly become unavailable upon the loss of a network connection between the client and the server. Although network connectivity is widely available, such connectivity is not guaranteed to be available or performing at a desired performance level. If user productivity depends on a remote connection, the performance benefits resulting from having a highly capable personal computer may be lost.

Various embodiments of the present disclosure employ a client-side caching approach to allow the vast resources of networked applications at the server to be made available to the client and executed at the client side even if a connection to the server becomes unavailable. It may be assumed that the connection between the cache and the full storage may fail to operate occasionally. Application modules as well as remote data may be cached such that the networked application remains usable through the client even if the network connection between the client and the server is temporarily down. In accordance with various embodiments, the user is able to maintain, via the client, cloud/server functionality in a virtual world environment regardless of whether a network connection becomes unavailable. Such temporary "out of service" conditions may be the result of network conditions between the client and the server. For various implementations, the geographic location and the available bandwidth associated with the network are not critical as the caching mechanisms disclosed operate under any number of network conditions.

For various embodiments, only a portion of the networked application environment is cached at the client side client in order to provide a cost-effective solution. However, any of a number of cost-effective, high-performance client devices may be implemented in the client-side caching techniques disclosed herein. Note that various networked applications may be executed without first being cached at the client side. The various embodiments of the caching mechanism disclosed may be implemented even for standard programs/applications that have not been modularized. For some programs, the entire program is simply processed as a single module. Finally, the granularity of the modules associated with networked applications will determine the performance of initial loading of a module and the size of the cache needed for optimal performance. In accordance with other embodiments, various functions of a program are executed at the client by fetching the module from the server to the cache in the client. In the following discussion, a general description of the system and its components is provided, followed by a discussion of the operation of the same.

With reference to FIG. 1, shown is a networked environment 100 according to various embodiments. The networked environment 100 includes one or more servers 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks. Note also that the connection between the server 103 and the client 106 may also comprise any type of physical media and lower layer link interface that supports the upper-layer applications such as a direct link through a RS232 connection, and so on.

The server 103 may comprise, for example, a server computer or any other system providing computing capability. Alternatively, a plurality of servers 103 may be employed that are arranged, for example, in one or more server banks or computer banks or other arrangements. For example, a plurality of servers 103 together may comprise a cloud computing resource, a grid computing resource, and/or any other distributed computing arrangement. Such servers 103 may be located in a single installation or may be distributed among many different geographical locations. For purposes of convenience, the server 103 is referred to herein in the singular. Even though the server 103 is referred to in the singular, it is understood that a plurality of servers 103 may be employed in the various arrangements as described above.

Various applications and/or other functionality may be executed in the server 103 according to various embodiments. In accordance with various embodiments, local computing resources with dynamic and desirable functions are utilized, where the computing resources at the server 103 may also be accessible to the client 106. The server 103 provides a mechanism that decides which modules are to be executed at the server 103. Alternatively, the server 103 may be configured to provide information about which modules may be executed at the server 103. The client 106 may then decide to execute modules locally or at the server 103 based on the capability of the server 103 and the information received from the server 103.

The server 103 evaluates the computing capability, the available bandwidth of the network connection, the various sizes of relevant application modules, the computing resources at the client side, and so on. For example, the server might provide a keyword search service, which may execute on the server 103 side or on both the server 103 side and the client 106 side. Note that the executable resources may be a part of the code profiling associated with the application modules. Also, various data is stored in an application store 112 and a data store 115 that are accessible to the server 103. The application store 112 and the data store 115 may each be representative of a plurality of data stores such as file servers, relational database management systems (RDBMS), storage services, and so on as can be appreciated. The data stored in the application store 112 and the data store 115 is associated with the operation of the various applications and/or functional entities described below.

The components executed on the server 103, for example, include an application server 118 and other applications, services, processes, systems, engines, or functionality not discussed in detail herein. The application server 118 is executed to serve up portions of networked applications 121 and files 124 over the network 109 for use by clients 106. To this end, the application server 118 may control access to the networked applications 121 and the files 124 for security, privacy, cost tracking, and other purposes. For some embodiments, the application server 118 may control access to the network applications 121 and the files 124 based on the user data usage profile 130, the application data usage profiles 133, and/or the user account data 136 in the data store 115 of the server 103.

The content stored in the application store 112 includes, for example, an inventory of a plurality of networked applications 121, and potentially other content other than that found in the data store 115. The networked applications 121 may correspond to any type of application, such as word processor applications, spreadsheet applications, office productivity applications, computer-assisted drafting applications, graphics manipulation applications, email applications, calendar applications, and so on. Each of the networked applications 121 may be segmented or divided into one or more modules 127. Each module 127 corresponds to code that is executable by the client 106 to implement a distinct functionality of the respective networked application 121.

For some embodiments, the size of each module may be different, and thus, each module 127 may be divided into one or more blocks of uniform size, where the number of blocks is a function of the module size. Based on how each module 127 is divided, the client 106 will allocate space in the module cache 145 to store the module 127. Information relating to the blocks associated with each module is stored in a code profile. For alternative embodiments, one or more modules may correspond to a single function, where each module may correspond to a distinct segment of functionality. Similarly, the links of the modules for a given function are stored in the code profile. A benefit of the techniques disclosed is a dynamic cache management scheme for maintaining the necessary stages in the cache.

As a non-limiting example, where the networked application 121 is a word processor, one module 127 may implement spell check functionality, another module 127 may implement an equation editing functionality, yet another module 127 may implement a print preview functionality, and so on. The granularity of the modules 127 may vary from very fine, such as a module 127 to provide font changes in word processor, to very course, such as a module 127 to provide the complete function of a clock application. The granularity affects the caching performance and storage requirements in the client 106.

Although one or more modules 127 may correspond to a base or initial functionality that are necessary for the networked application 121 to be usable in the client 106, it may be the case that other modules 127 are seldom used by any given user. Thus, the client 106 may maintain copies of only those modules 127 which have been used, are being used, or are likely to be used by the user in the course of interacting with the respective networked application 121. In one embodiment, the modules 127 are automatically identified and generated from a monolithic networked application 121, e.g., by way of code profiling or some other approach. In another embodiment, the networked application 121 is structured into modules 127 by the application developer. The modules 127 are so structured so as to minimize unnecessary dependencies among modules 127. It is noted that a networked application 121 may be executed by the client 106 in spite of the client 106 caching only a portion of the modules 127 that make up the networked application 121.

The data stored in the data store 115 includes, for example, a plurality of files 124, user data usage profiles 130, application data usage profiles 133, user account data 136, and potentially other data. The files 124 correspond to various application-related input and output data that may be resident in the server 103. The files 124 may be associated with particular users and may be restricted to use by the particular users. Each of the files 124 may be divided into one or more blocks 139. A particular networked application 121 may operate on just a portion of a file 124 at any given time, and the portion may be downloaded and cached by the client 106 in a manner similar to that of the modules 127. In contrast to the modules 127, the client 106 may modify one or more of the blocks 139, which will subsequently be updated in the data store 115 pending connectivity via the network 109.

The user data usage profiles 130 may be used to predict data access for a particular users, a group of users, or all users in the aggregate. The user data usage profiles 130 may indicate which networked applications 121 are likely to be used, which modules 127 in the networked applications 121 are likely to be used, which files 124 are likely to be used, which blocks 139 in the files 124 are likely to be used, and so on. The user data usage profiles 130 may be based on, or include, data relating to past data accesses by users or clients 106.

The application data usage profiles 133 may be used to predict data access for networked applications 121. Such data access may relate to access of particular modules 127 by other modules 127, access of files 124 by particular modules 127, access of blocks 139 by particular modules 127, and so on. The application data usage profiles 133 may be based on, or include, data relating to past data accesses by networked applications 121. Further, the application data usage profiles 133 may be based on code profiling of the modules 127. The user account data 136 may include various data associated with user account such as authentication data, logging data, subscription status data, payment instrument data, file 124 permissions data, account plan access rights data, and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display comprising, for example, one or more devices such as cathode ray tubes (CRTs), liquid crystal display (LCD) screens, gas plasma-based flat panel displays, LCD projectors, or other types of display devices, etc. The client 106 may further include some input devices as a keyboard, touchscreen interface, mouse, and so on.

The client 106 may be configured to execute various applications such as one or more client applications 142 and/or other applications. The client applications 142 may include one or more of the networked applications 121 hosted by the server 103. In some cases, the client applications 142 may include a bootstrapping application used to select networked applications 121 and to download and execute initial modules 127 for the selected networked applications 121. The client applications 142 may also include, for example, browser applications, mobile applications, email applications, instant message applications, and/or other applications.

The client 106 may include a module cache 145 and a data cache 148. The module cache 145 may include modules 127 which have been used, are being used, or are predicted to be used by networked applications 121 executed by the client 106. The module cache 145 may have a smaller storage than the application store 112 since it may be unlikely that a client 106 would be employing all modules 127 from the application store 112 at any given time. The size of the module cache 145 may be of a sufficient size so as to contain the working set of modules 127 employed by the user using the networked applications 121. The data cache 148 may include blocks 139 that have been used, are being used, or are predicted to be used by networked applications 121 executed by the client 106. Similarly to the module cache 145, the data cache 148 may have a smaller storage than the data store 115 since it may be unlikely that a client 106 would be using all of the blocks 139 of the files 124 at any given time.

Next, a general description of the operation of the various components of the networked environment 100 is provided. To begin, a user at a client 106 authenticates with the application server 118 using a browser or other specific client application 142. For example, the user may have an account with the application server 118. The user selects a networked application 121 from a listing of potentially a multitude of networked applications 121. The application server 118 may verify that the user account is permitted access to the selected networked application 121. A portion of the networked application 121 is downloaded to the client 106, if not already cached by the client 106. The portion may correspond to some initial or base functionality. The functionality may alternatively correspond to essential features that supplement some base functionality associated with a networked application 121. For example, the networked application 121 may comprises a text editor where additional features (e.g., spell check) of the text editor are embodied as modules that are cached at the client side.

Other features may comprise digital rights management (DRM) functions and so on. In particular, the portion corresponds to one or more modules 127 which are downloaded over the network 109 to the client 106. If one or more modules 127 are requested by a client 106, the application server 118 may be configured to also send other modules 127 that may be needed according to user data usage profiles 130 or application data usage profiles 133. The modules 127 are cached by the module cache 145 and are executed on an as-needed basis to implement the networked application 121.

It is noted that the user experience is improved with respect to conventional client-based applications which may be downloaded in that the networked application 121 is almost immediately available. In some embodiments, no explicit installation procedure is necessary. A conventional client-based application may be gigabytes or more in size, which could take a long time to download. By contrast, the modules 127 for the initial functionality of the networked application 121 may correspond to just a small fraction of the size of the complete networked application 121. Thus, the initial functionality for the networked application 121 may be downloaded and executed quickly. Additionally, the modules 127 may be replaced as needed to provide updates to the networked application 121.

Further, the module cache 145 may be much smaller than the complete application store 112, which may result in a lower-cost client 106 that does not need as much data storage space. A user may use only a few of the networked applications 121 that are available, and the user may use some networked applications 121 very infrequently. Accordingly, it is not necessary to maintain the code for unused or infrequently used networked applications 121 in the module cache 145.

Various cache replacement and pre-fetching techniques may be employed to optimize the module cache 145. The user may configure various parameters of the modules cache 145, so as to lock certain modules 127 or to assist pre-fetching logic. The replacement logic may automatically maintain the coherence between the main data store at the server-side and the caches at the client 106. This provides a backup of the client 106. Even with a failure of the client 106, the client 106 can restart from scratch and reload everything from the server through the caching mechanism as the client 106 resumes its operations.

As the user continues to use the networked application 121, the user may invoke functionality implemented by modules 127 which is not in the module cache 145. Thus, the client application 142 may be configured to obtain the necessary modules 127 from the application server 118 through pre-fetching or on an as-needed basis. For example, the user may invoke an equation editor of a word processor, and the client application 142 will download the corresponding module(s) 127 for execution by the client 106.

Although connectivity to the network 109 is needed to download modules 127, the client 106 can continue executing the modules 127 of the networked application 121 which are already downloaded and still in the module cache 145. Therefore, a user at the client 106 is able to use the networked application 121 despite a temporary loss of connectivity to the network 109 and to the server 103. In other words, a loss of connectivity to the network 109 does not impair usability of the distinct functionality provided by modules 127 in the module cache 145.

This is in contrast to conventional network-based applications which perform all processing at the server side. When connectivity is lost to the server with a conventional network-based application, the application becomes unusable until connectivity is restored. Also, conventional network-based applications suffer from performance issues. Here, the user interfaces are rendered in the client 106 by code executed in the client 106, thereby providing a much more responsive user experience. By using reasonable caching approaches, a cache "miss" for a module 127 in a client 106 coupled with a temporary loss of connectivity to the network 109 may be a rare event. Upon such an event, a notification to the user may be generated which indicates that the functionality is currently unavailable.

Since the client 106 and application server 118 continue to operate independently even during a temporary loss of network 109 connectivity, certain operations that may require the network 109 connection may be completed with a delay. These operations may be batched together. When the network 109 connection is reestablished, the client 106 and the application server 118 may synchronize automatically, and the delayed operations may then be completed. In this regard, operations are not suspended unless the necessary data blocks are not cached. At the client 106 side, data access by the client 106 or the server 103 are seamless from the perspective of the user. The data management mechanism provides the desired blocks to the client application according to the operation, associations of the blocks, and so on. If the desired module 127 has already been cached in the client 106, a temporary loss of connectivity does not affect the overall operation and is therefore not visible to the user.

Data may be cached at the client 106 in addition to executable modules 127. Various files 124 may be stored by the application server 118, and the files 124 may be divided into one or more blocks 139. The blocks 139 may be cached in the data cache 148 according to pre-fetching or on an as-needed basis. Locking may be provided such that a block 139 or file 124 may have one writer and multiple readers. By storing data in the data store 115, a user may access the data remotely through different clients 106 and/or recover from a failure in a client 106.

The data cache 148 may be, for example, a write-through cache or a write-back cache as can be appreciated. Backup using a cache-coherence mechanism may only transfer changed information to the server, thereby minimizing the amount of data that needs to be copied to make a full backup. The line of data written back from the cache to the main data store 115 to maintain coherency may be logged on a per-transaction basis to provide a historical record and allow modified data to be rewound. In some cases, the user may specify that certain types of data, such as large video data, may be read only with no write-back of data.

Multiple modules 127 may be executed by the client 106 at a particular time. Such modules 127 may correspond to different processes in the operating system of the client 106 and may be in communication with one another, for example, through inter-process communication. Alternatively, virtual machine techniques may be employed such that a networked application 121 executes as a virtualized environment under the operating system of the client 106, where the modules 127 are various threads or processes within the virtualized environment. A virtualized environment may provide the controlled sharing between modules 127 so that a set of the modules 127 can operate cooperatively to accomplish a task for the user. Furthermore, modules 127 may be executed on either the client 106 or the server 103 in a virtual environment.

FIG. 1 depicts a non-limiting example of an application store 112 with multiple networked applications 121a, 121b, 121c, and 121N, where N represents the total number of networked applications (e.g., four). Each of the networked applications 121 is segmented into one or more modules 127. The networked application 121a is segmented into eight modules 127a, 127b, 127c, 127d, 127e, 127f, 127g, and 127h. The networked application 121b is segmented into two modules 127i and 127j. The networked application 121c is segmented into one module 127k. Finally, the networked application 121N is segmented into eight modules 127l, 127m, 127n, 127o, 127p, 127q, 127r, and 127s. The module cache 145 of the client 106, as depicted, holds six modules 127. In this case, the module cache 145 has cached modules 127c and 127h of networked application 121a; module 127i of networked application 121 b; and modules 127m, 127r, and 127s of networked application 121N. It is noted that the modules 127 may or may not be of a standardized or consistent size. In this regard, some modules 127 may be of a standard size while others are not.

FIG. 1 also depicts a non-limiting example of a data store 115 with multiple files 124a, 124b, and 124N, where N represents the total number of files (e.g., three). Each of the files 124 is segmented into one or more blocks 139. The file 124a is segmented into four blocks 139a, 139b, 139c, and 139d. The file 124b is segmented into two blocks 139e and 139f. Finally, the file 124N is segmented into four blocks 139g, 139h, 139i, and 139j. The data cache 148 of the client 106, as depicted, holds three blocks 139. In this case, the data cache 148 has cached block 139f of file 124b, block 139d of file 124a, and block 139h of file 124N. It is noted that the blocks 139 may or may not be of a standardized or consistent size.

Figure 2:
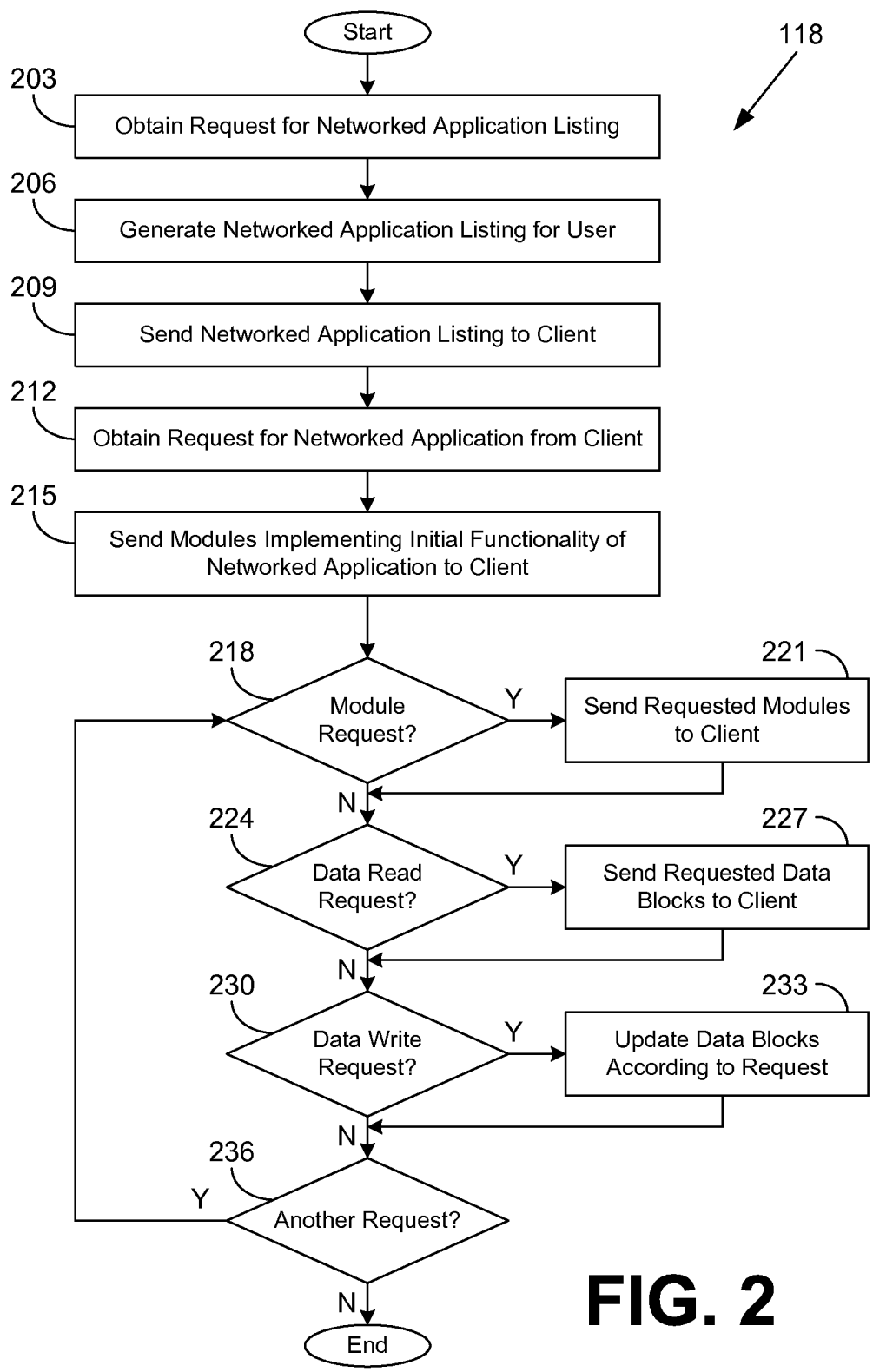
FIG. 2 is a flowchart illustrating one example of functionality implemented as portions of an application server executed in a computing device in the networked environment of FIG. 1 according to various embodiments of the present disclosure.

Referring next to FIG. 2, shown is a flowchart that provides one example of the operation of a portion of the application server 118 according to various embodiments. It is understood that the flowchart of FIG. 2 provides merely an example of the many different types of functional arrangements that may be employed to implement the operation of the portion of the application server 118 as described herein. As an alternative, the flowchart of FIG. 2 may be viewed as depicting an example of steps of a method implemented in the server 103 (FIG. 1) according to one or more embodiments.

Beginning with block 203, the application server 118 obtains a request from the client 106 (FIG. 1) for a listing of networked applications 121 (FIG. 1) hosted by the application server 118 (FIG. 1). The client 106 may correspond to a registered user who has been authenticated. Alternatively, the client 106 may correspond to a user who is unregistered. In block 206, the application server 118 generates a listing of networked applications 121 in response to the request. Such a listing may be customized for the user based on user account data 136 (FIG. 1), subscription information, pricing information, frequency of use, and/or other data. In block 209, the application server 118 sends the listing of networked applications 121 to the client 106.

In block 212, the application server 118 obtains a request to launch a networked application 121 from the client 106. Note that the networked application 121 is launched when the networked application 121 is downloaded. Note also that the launch does not require the entire networked application 121 to be downloaded. Only the minimal modules needed to start the networked application 121 are downloaded. If the minimal modules of the networked application 121 have already been cached, the networked application 121 can be launched immediately. In block 215, the application server 118 sends modules 127 (FIG. 1) which implement an initial or base functionality of the networked application 121 to the client 106. Some or all of these modules 127 may or may not actually be sent depending on whether a current version of the respective module 127 is stored by the client 106 in the module cache 145 (FIG. 1). Additional modules 127 which implement other functionality may also be sent automatically based at least in part on user data usage profiles 130 (FIG. 1), application data usage profiles 133 (FIG. 1), and/or other data. Upon the modules 127 being present at the client 106, the client 106 may be configured to begin execution of the networked application 121.

In block 218, the application server 118 determines whether the client 106 has requested another module 127 or modules 127 to be sent for use in the networked application 121. If the client 106 requests additional modules 127, the application server 118 sends the requested modules 127 to the client 106 in block 221. The application server 118 proceeds to block 224. If no additional module 127 request is received, the application server 118 proceeds from block 218 to block 224.

In block 224, the application server 118 determines whether the client 106 has issued a data read request for one or more blocks 139 (FIG. 1) of files 124 (FIG. 1). If the client 106 has issued a data read request, the application server 118 sends the requested data blocks 139 to the client 106 in block 227. The application server 118 proceeds to block 230. If no data read request is received, the application server 118 proceeds from block 224 to block 230.

In block 230, the application server 118 determines whether the client 106 has issued a data write request for one or more blocks 139 of files 124. If the client 106 has issued a data write request, the application server 118 obtains the updated blocks 139 from the request and updates the data blocks 139 in the data store 115 (FIG. 1) according to the request in block 233. The application server 118 proceeds to block 236. If no data write request is received, the application server 118 proceeds from block 230 to block 236. Note that for some embodiments, the server 103 may perform module management as outlined above for block 218 in addition to data management, as outlined in blocks 224-230, where the steps may be performed in sequence or concurrently. The steps may also be triggered based on a request originating from the client 106.

In block 236, the application server 118 determines whether another request is to be received from the client 106 regarding the networked application 121 executed by the client 106. If another request is received, the application server 118 returns to block 218 and determines whether a module 127 (FIG. 1) request is received. Otherwise, the portion of the application server 118 ends.

Figure 3A:
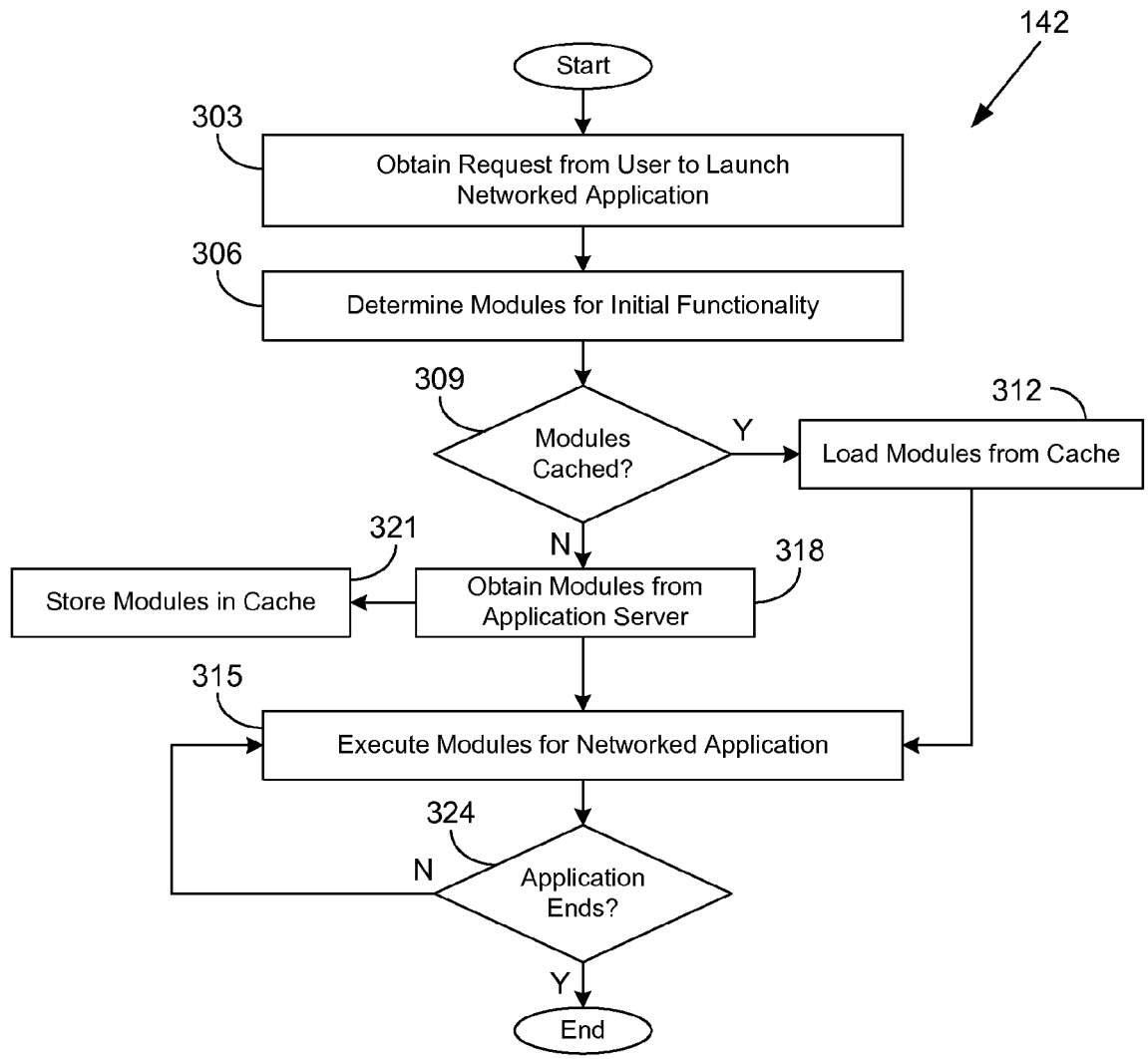
FIGS. 3A-3C are flowcharts illustrating examples of functionality implemented as portions of a client application executed in a client in the networked environment of FIG. 1 according to various embodiments of the present disclosure.

Continuing on to FIG. 3A, shown is a flowchart that provides one example of the operation of a portion of the client application 142 according to various embodiments. It is understood that the flowchart of FIG. 3A provides merely an example of the many different types of functional arrangements that may be employed to implement the operation of the portion of the client application 142 as described herein. As an alternative, the flowchart of FIG. 3A may be viewed as depicting an example of steps of a method implemented in the client 106 (FIG. 1) according to one or more embodiments.

Beginning with block 303, the client application 142 obtains a request from a user to launch a networked application 121 (FIG. 1) hosted by the application server 118 (FIG. 1). In block 306, the client application 142 determines which modules 127 (FIG. 1) of the networked application 121 are needed for an initial or base functionality. For some embodiments, a user interface may be utilized to allow a user to manually specify which modules to pre-fetch, where the user interface within the client application 142 guides the user in selecting the desired functionality.

The user interface may provide, for example, a selectable list according to hierarchical categories, keyword searches, user experience, and so on. The client application may be executed with the base or essential functionality, and any remaining functionality may be later fetched. The priorities of the modules are also determined in order to provide the desirable functions in sequence. This is useful particularly when there is limited network connectivity. In block 309, the client application 142 determines whether the needed modules 127 are cached in the module cache 145 (FIG. 1). If the modules 127 are cached and up-to-date, the client application 142 loads the modules 127 from the module cache 145 in block 312. The client application 142 then proceeds to block 315.

If one or more modules 127 are not cached, or if the modules 127 are cached but are not the current version, the client application 142 instead moves from block 309 to block 318. In block 318, the client application 142 obtains the needed modules 127 from the application server 118 over the network 109 (FIG. 1). In block 321, the client application 142 stores the obtained modules 127 in the module cache 145. In this regard, the requested modules 127 are sent directly to the requester and the module cache 145 is written to in parallel (in the background) for future access. The client application 142 then proceeds to block 315.

In block 315, the client application 142 executes one or more of the modules 127 to provide the functionality of the networked application 121. A module 127 which is currently executed in the client 106 may in turn call one or more other modules 127, which may or may not be in the module cache 145. In block 324, the client application 142 determines whether the networked application 121 has ended. The tasks relating to block 315 will be further described in connection with the flowcharts of FIGS. 3B and 3C. If the networked application 121 has not ended, the client application 142 returns to block 315 and continues execution of modules 127 for the networked application 121. If the networked application 121 has ended, the portion of the client application 142 then ends.

Figure 3B:
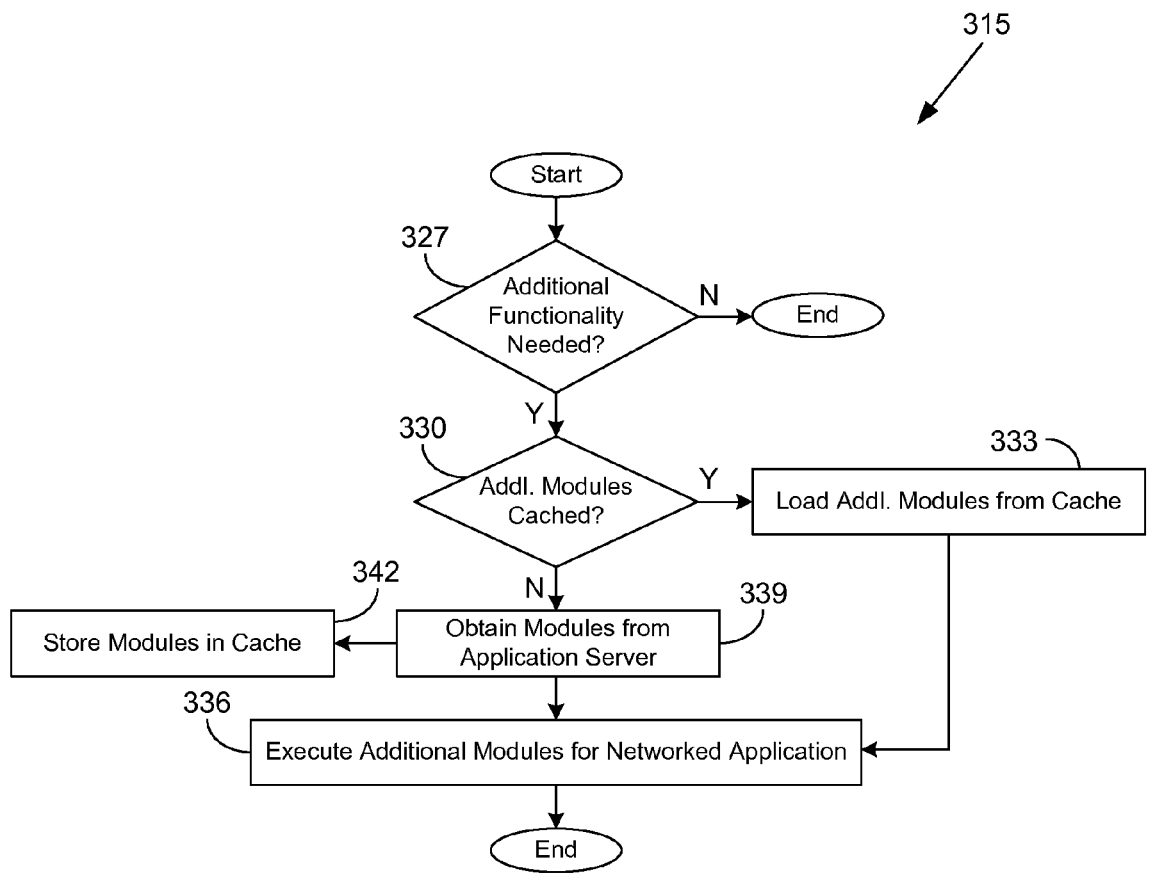

Turning now to FIG. 3B, shown is a flowchart that provides one example of the operation of another portion of the client application 142 (FIG. 1) according to various embodiments. In particular, the flowchart of FIG. 3B further describes block 315 of the flowchart of FIG. 3A. It is understood that the flowchart of FIG. 3B provides merely an example of the many different types of functional arrangements that may be employed to implement the operation of the portion of the client application 142 as described herein. As an alternative, the flowchart of FIG. 3B may be viewed as depicting an example of steps of a method implemented in the client 106 (FIG. 1) according to one or more embodiments.

Beginning with block 327, the client application 142 determines whether the networked application 121 (FIG. 1) needs additional functionality beyond that provided by the modules 127 (FIG. 1) currently executed by the client 106. For example, a user may invoke the additional functionality by way of a user interface. If no additional functionality is needed, the portion of the client application 142 ends. If additional functionality is needed, the client application 142 proceeds to block 330.

In block 330, the client application 142 determines whether the additional modules 127 that provide the additional functionality are cached by the module cache 145 (FIG. 1). If the additional modules 127 are cached and are up-to-date, the client application 142 loads the additional modules 127 from the module cache 145 in block 333. The client application 142 then proceeds to block 336. If the additional modules 127 are not cached or are cached but not updated versions, the client application 142 instead proceeds from block 330 to block 339.

In block 339, the client application 142 obtains the additional modules 127 from the application server 118 (FIG. 1)

by way of the network 109 (FIG. 1). In some cases, the client application 142 may also obtain modules 127 that are predicted to be executed later. For some embodiments, the pre-fetching operation may be based on input obtained via a user interface or based on a user profile, which comprises information corresponding to past user experience at the client 106 side.

In block 342, the client application 142 stores the additional modules 127 obtained from the application server 118 into the module cache 145. In this regard, the requested modules 127 are sent directly to the requester and the module cache 145 is written to in parallel (in the background) for future access. In block 336, the client application 142 executes the additional modules 127 for the networked application 121 to provide the desired additional functionality. Thereafter, the portion of the client application 142 ends.

Figure 3C:
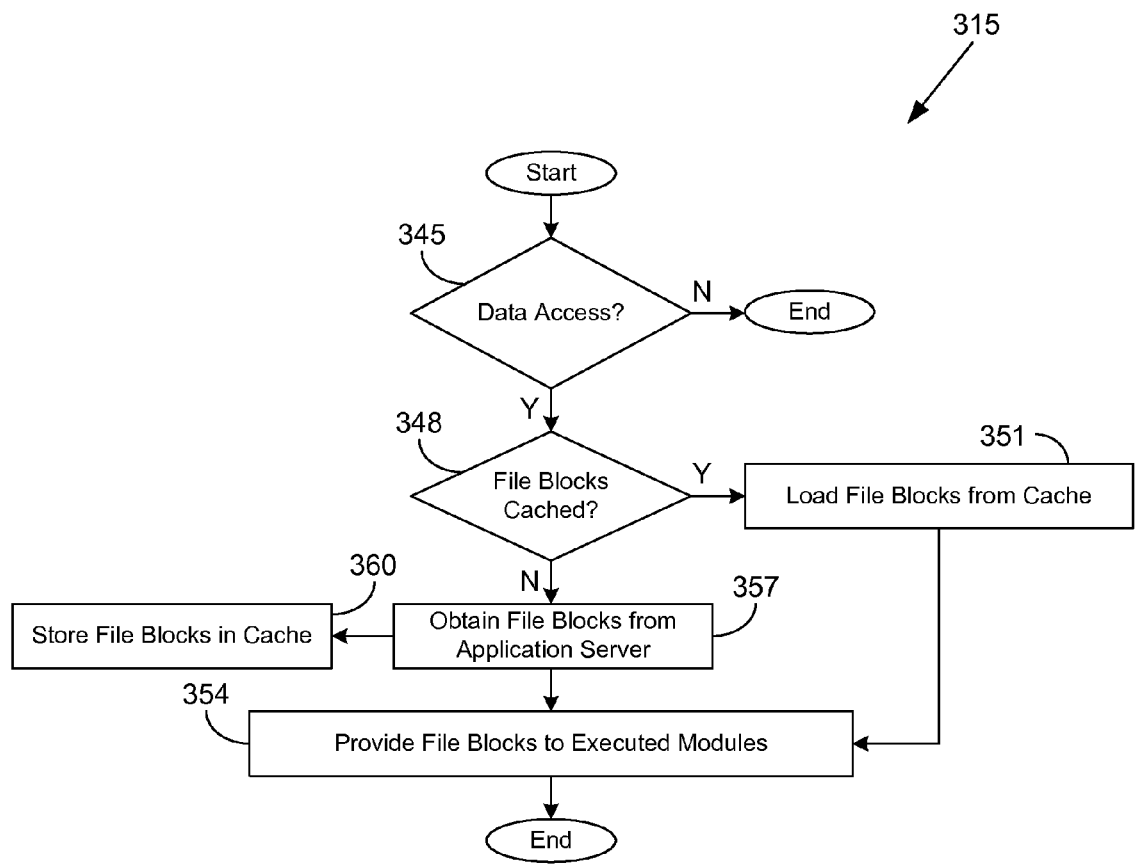

Moving on to FIG. 3C, shown is a flowchart that provides one example of the operation of yet another portion of the client application 142 (FIG. 1) according to various embodiments. In particular, the flowchart of FIG. 3C further describes block 315 of the flowchart of FIG. 3A. It is understood that the flowchart of FIG. 3C provides merely an example of the many different types of functional arrangements that may be employed to implement the operation of the portion of the client application 142 as described herein. As an alternative, the flowchart of FIG. 3C may be viewed as depicting an example of steps of a method implemented in the client 106 (FIG. 1) according to one or more embodiments.

Beginning with block 345, the client application 142 determines whether the networked application 121 (FIG. 1) has made a data access. For example, a user may load a particular file 124 (FIG. 1) for editing, viewing, etc. If no data access is made, the portion of the client application 142 ends. If a data access is made, the client application 142 proceeds to block 348.

In block 348, the client application 142 determines whether the data blocks 139 (FIG. 1) which correspond to the data access are cached by the data cache 148 (FIG. 1). If the blocks 139 are cached and are up-to-date, the client application 142 loads the blocks 139 from the data cache 148 in block 351. The client application 142 then proceeds to block 354. If the blocks 139 are not cached or are cached but not the latest versions, the client application 142 instead proceeds from block 348 to block 357.

In block 357, the client application 142 obtains the requested blocks 139 of the file 124 from the application server 118 (FIG. 1) by way of the network 109 (FIG. 1). In some cases, the client application 142 may pre-fetch additional blocks 139 that are predicted to be accessed later. Note that the data pre-fetch mechanism may operate in a similar fashion as the module pre-fetch mechanism. In block 360, the client application 142 stores the blocks 139 obtained from the application server 118 into the data cache 148. In this regard, the requested blocks 139 are sent directly to the requester and the data cache 148 is written to in parallel (in the background) for future access. In block 354, the client application 142 provides the blocks 139 to the networked application 121 to facilitate the data access. Thereafter, the portion of the client application 142 ends.

Figure 4:
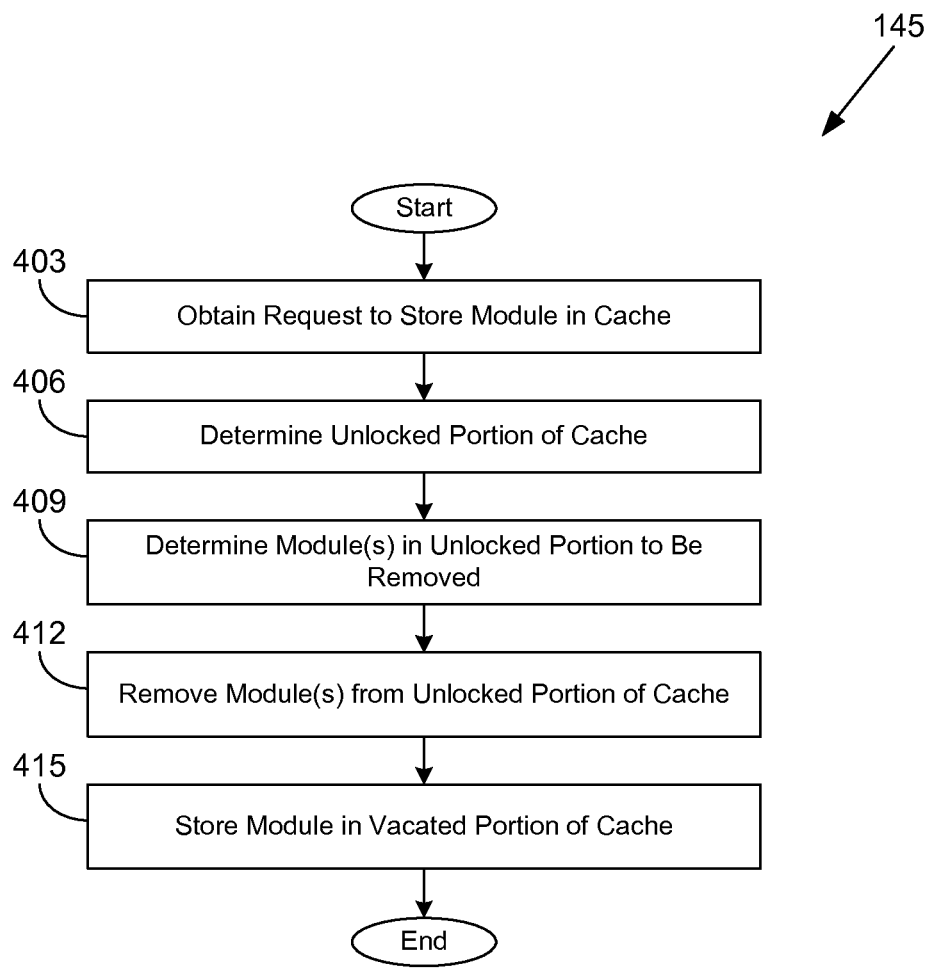
FIG. 4 is a flowchart illustrating one example of functionality implemented as portions of a module cache executed in a client in the networked environment of FIG. 1 according to various embodiments of the present disclosure.

Referring next to FIG. 4, shown is a flowchart that provides one example of the operation of a portion of the module cache 145 according to various embodiments. It is understood that the flowchart of FIG. 4 provides merely an example of the many different types of functional arrangements that may be employed to implement the operation of the portion of the module cache 145 as described herein. As an alternative, the flowchart of FIG. 4 may be viewed as depicting an example of steps of a method implemented in the client 106 (FIG. 1) according to one or more embodiments.

Beginning with block 403, the module cache 145 obtains a request to store a module 127. In block 406, the module cache 145 determines the unlocked portion of the module cache 145. For example, some modules 127 may be designated as locked and may not be removed from the module cache 145. In block 409, the module cache 145 determines one or more modules 127 in the unlocked portion of the module cache 145 to be removed to make room for the new modules 127.

Various cache replacement policies may be used as can be appreciated, such as, for example, least recently used (LRU), least frequently used (LFU), adaptive replacement (AR), multi-queue (MQ) caching algorithm, and so on. For some embodiments, the data cache 148 and the module cache 145 may be implemented as separate cache memories with separate cache management. Note, however, that for some embodiments, the data cache 148 and the module cache 145 may be implemented as one common cache. The benefit of implementing one cache is the flexibility involved in occupying space within the cache for both data and program modules. The cache management scheme for a common cache, however, tends to be more complex. In general, it is preferable to implement the data cache 148 and the module cache 145 as separate cache memories due to the difference in characteristics associated with data blocks and program modules.

Program modules, for example, typically comprise read-only files. The complete set of modules is generally stored on the server 103 side. The program modules are constantly being updated by the server. The client 106 caches the program modules as needed, and program modules are discarded at the client side when the space occupied by the program modules is needed by other program modules.

Generally, there are two main types of data blocks—data blocks that are preferably stored at the server 103 side and data block that are preferably stored at the client side 106. Data blocks that are preferably stored at the server 103 side typically comprise large blocks of data such as movie files and databases. Many times, the replacement of this type of data block is a relatively simple process. If a data block has been modified, that data block is written back to the server 103 before the space is freed up. If the network connection is lost, the data block is locked in place.

With data blocks that are preferably stored at the client 106 side, the size tends to be relatively small, and users can access the data block without a network connection. The user typically has direct control over the privacy of the data. A copy of the data blocks can be backed up at the server 103. If a data block is modified, the data block is written back but at low priority as the most updated version of the data block stays at the client 106 side. The data block(s) written back to the server 103 mainly serves a backup function.

With both types of data blocks, a write-back algorithm is typically utilized because of the relatively slow speed involved in writing the data from the client 106 to the server 103. A replacement algorithm is executed when the space corresponding to a data block is to be freed up for a new data block.

In block 412, the module cache 145 removes one or more modules 127 from the module cache 145 to free space. In some instances, however, block 412 may simply comprise making the free space available if data has not been written to that space yet. In block 415, the module cache 145 stores the new modules 127 in the vacated portion of the module cache 145. In some embodiments, the module cache 145 may simply overwrite the modules 127 to be removed with the new modules 127, with no explicit removal or eject function. Thereafter, the portion of the module cache 145 ends.

Figure 5:
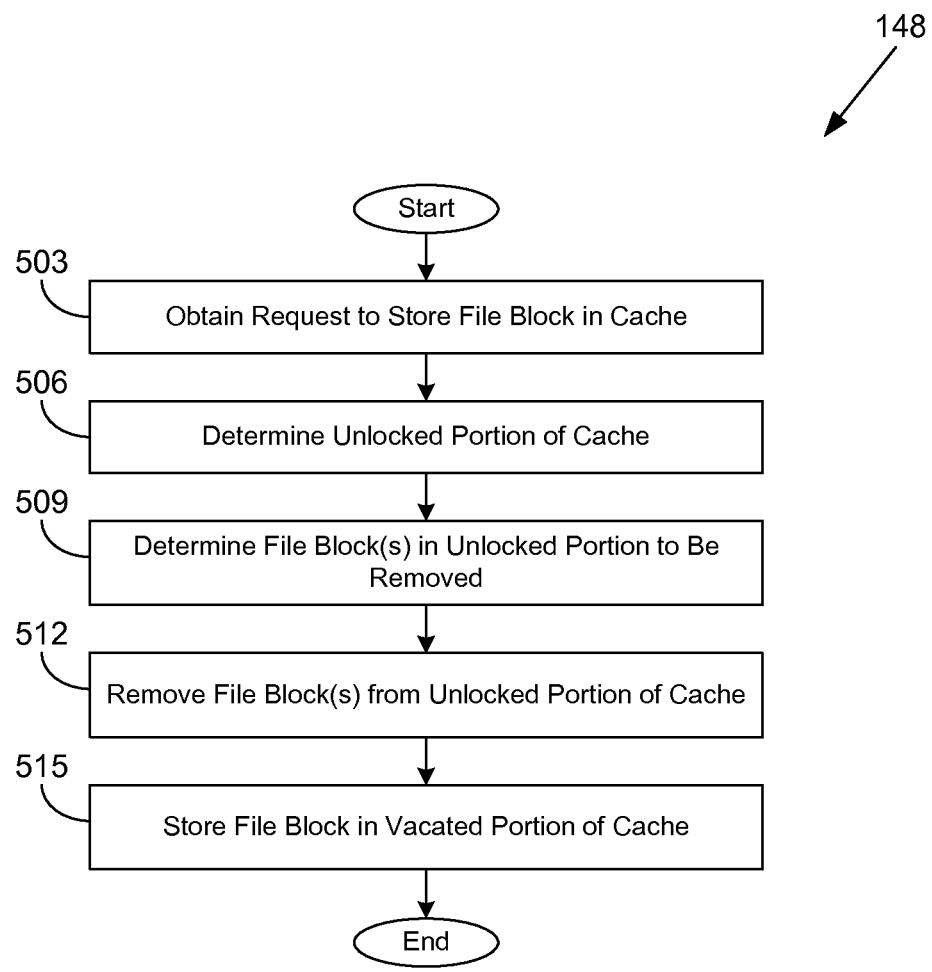
FIG. 5 is a flowchart illustrating one example of functionality implemented as portions of a data cache executed in a client in the networked environment of FIG. 1 according to various embodiments of the present disclosure.

Moving now to FIG. 5, shown is a flowchart that provides one example of the operation of a portion of the data cache 148 according to various embodiments. It is understood that the flowchart of FIG. 5 provides merely an example of the many different types of functional arrangements that may be employed to implement the operation of the portion of the data cache 148 as described herein. As an alternative, the flowchart of FIG. 5 may be viewed as depicting an example of steps of a method implemented in the client 106 (FIG. 1) according to one or more embodiments.

Beginning with block 503, the data cache 148 obtains a request to store a block 139. In block 506, the data cache 148 determines the unlocked portion of the data cache 148. For example, some blocks 139 may be designated as locked and may not be removed from the data cache 148. In block 509, the data cache 148 determines one or more blocks 139 in the unlocked portion of the data cache 148 to be removed to make room for the new blocks 139. Various cache replacement policies may be used as can be appreciated, such as, for example, least recently used (LRU), least frequently used (LFU), adaptive replacement (AR), multi-queue (MQ) caching algorithm, and so on.

In block 512, the data cache 148 removes one or more blocks 139 from the data cache 148 to free space. In some instances, however, block 512 may simply comprise making the free space available if data has not been written to that space yet. In block 515, the data cache 148 stores the new blocks 139 in the vacated portion of the data cache 148. In some embodiments, the data cache 148 may simply overwrite the blocks 139 to be removed with the new blocks 139, with no explicit removal or eject function. Thereafter, the portion of the data cache 148 ends.

Figure 8:
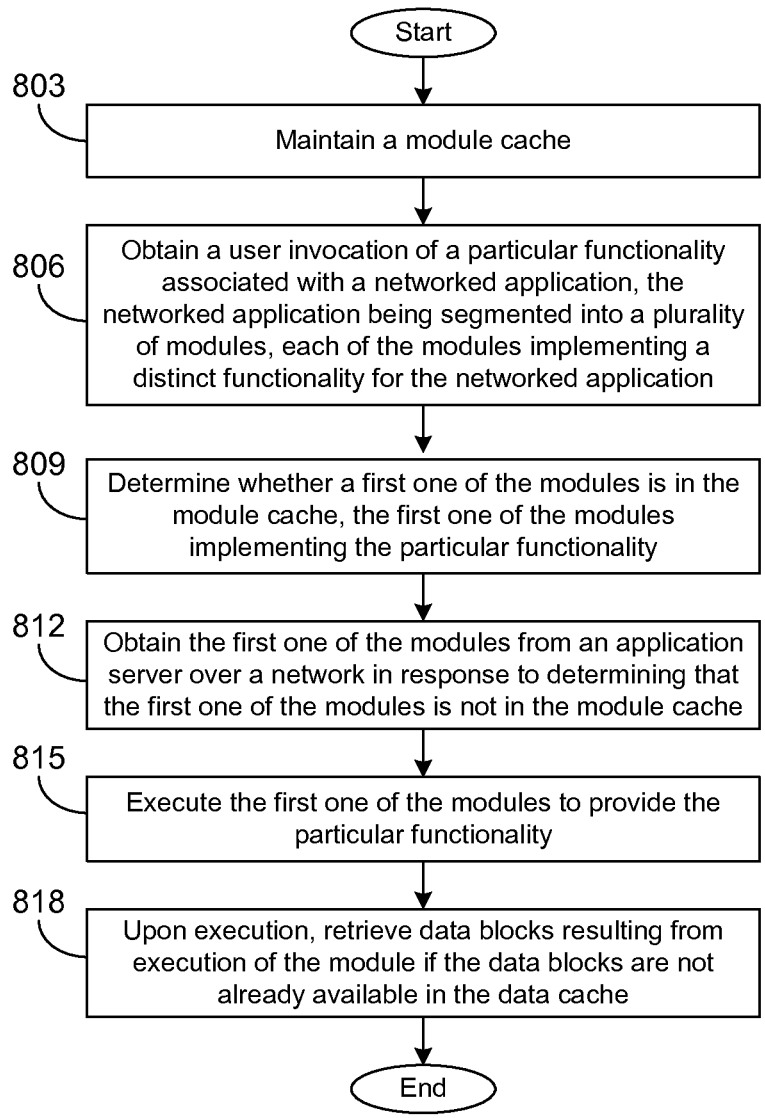
FIG. 8 is a flowchart illustrating one example of functionality implemented in a client in the networked environment of FIG. 1 according to various embodiments of the present disclosure.

Reference is made to FIG. 8, which is a flowchart that provides one example of the operation of a client 106 according to various embodiments. It is understood that the flowchart of FIG. 8 provides merely an example of the many different types of functional arrangements that may be employed to implement the operation of the portion of the data cache 148 as described herein. As an alternative, the flowchart of FIG. 8 may be viewed as depicting an example of steps of a method implemented in the client 106 (FIG. 1) according to one or more embodiments.

In block 803, a module cache in maintained, and in block 806, a user invocation of a particular functionality associated with a networked application is obtained, where the networked application is segmented into a plurality of modules, and where each of the modules implementing a distinct functionality for the networked application.

In block 809, a determination is made on whether a first one of the modules is in the module cache, where the first one of the modules implements the particular functionality. In block 812, the first one of the modules is obtained from an application server over a network in response to determining that the first one of the modules is not in the module cache In block 815, the first one of the modules is executed to provide the particular functionality. In block 818, data blocks needed by the module are retrieved from the network if the data blocks are not already available in the data cache.

In accordance with various embodiments, user account based information may be utilized to control access to the features disclosed herein relating to fetching or preloading of modules and information/data. For some embodiments, restricted access to the application server 118 (FIG. 1) is implemented where access control is first performed by a login server. Upon logging in, the user is able to access the application server 118. In general, access control and profiling are performed outside of the application server 118.

It should be emphasized that the application server 118 performs various intelligent operations, which includes determining the first module to send to the client 106 (FIG. 1) and also determining which subsequent modules to send to the client 106. From a high level, this model allows the client 106 to view the networked application 121 (FIG. 1) as one unit, and the application server 118 manages the modules to send. Another model involves the application server 118 taking on a more passive role, while the client 106 handles management of the modules. For each networked application 121, the application server 118 provides the structure of the modules. The client 106 downloads whatever data is needed. The application server 118 merely responds to client 118 requests.

In some instances, the networked application 121 takes on a more active role, and both the client 106 and the application server 118 are passive. The networked application 118, based on user input, requests modules and blocks as needed. The client 106 and the application server 118 merely manages the downloading process to obtain the requested information from the application server 118 for storage in the module cache 145 and data cache 148 at the client 106.

Figure 6:
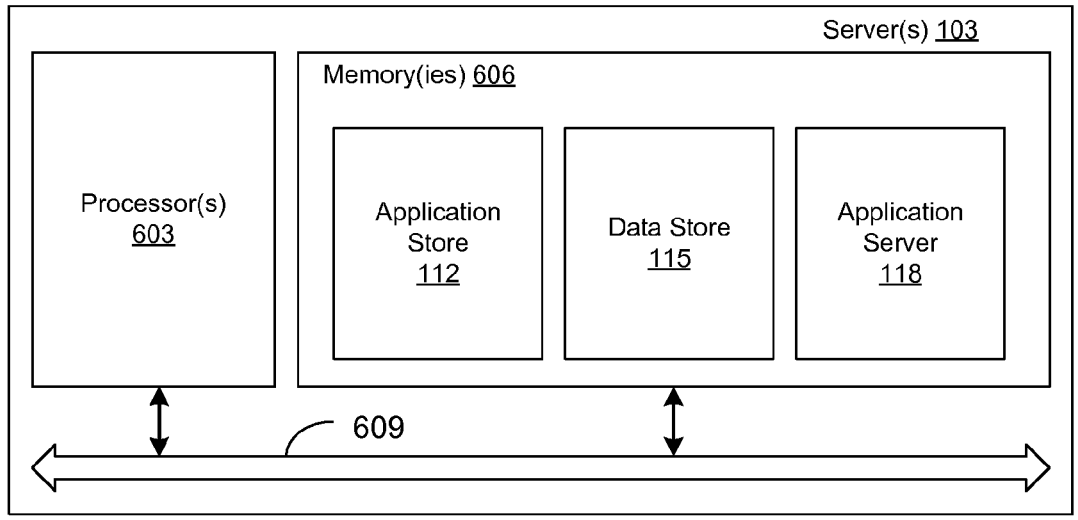
FIG. 6 is a schematic block diagram that provides one example illustration of a computing device employed in the networked environment of FIG. 1 according to various embodiments of the present disclosure.

With reference to FIG. 6, shown is a schematic block diagram of the server 103 according to an embodiment of the present disclosure. The server 103 includes at least one processor circuit, for example, having a processor 603 and a memory 606, both of which are coupled to a local interface 609. To this end, the server 103 may comprise, for example, at least one server computer or like device. The local interface 609 may comprise, for example, a data bus with an accompanying address/control bus or other bus structure as can be appreciated. An interface to the network 109 (FIG. 1) may be coupled to the local interface 609.

Stored in the memory 606 are both data and several components that are executable by the processor 603. In particular, stored in the memory 606 and executable by the processor 603 is the application server 118 and potentially other applications. Also stored in the memory 606 may be an application store 112, a data store 115, and other data. In addition, an operating system may be stored in the memory 606 and executable by the processor 603.

Figure 7:
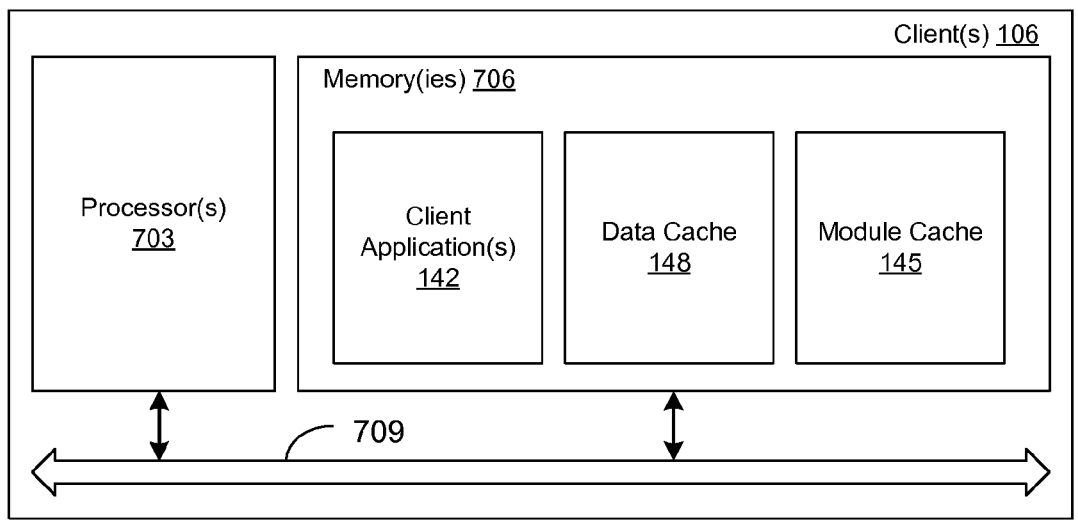
FIG. 7 is a schematic block diagram that provides one example illustration of a client employed in the networked environment of FIG. 1 according to various embodiments of the present disclosure.

Turning next to FIG. 7, shown is a schematic block diagram of the client 106 according to an embodiment of the present disclosure. The client 106 includes at least one processor circuit, for example, having a processor 703 and a memory 706, both of which are coupled to a local interface 709. To this end, the client 106 may comprise, for example, at least one client computer or like device. The local interface 709 may comprise, for example, a data bus with an accompanying address/control bus or other bus structure as can be appreciated. An interface to the network 109 (FIG. 1) may be coupled to the local interface 709.

Stored in the memory 706 are both data and several components that are executable by the processor 703. In particular, stored in the memory 706 and executable by the processor 703 are the client applications 142 and potentially other applications. Also stored in the memory 706 may be a data cache 148, a module cache 145, and other data. In addition, an operating system may be stored in the memory 706 and executable by the processor 703.

Referring now to both FIGS. 6 and 7, it is understood that there may be other applications that are stored in the memories 606, 706 and are executable by the processors 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the respective memory 606, 706 and are executable by the respective processor 603, 703. In this respect, the term "executable" means a program file that is in a form that can ultimately be run by the processors 603, 703. Examples of executable programs may be, for example, a compiled program that can be translated into machine code in a format that can be loaded into a random access portion of the memories 606, 706 and run by the processors 603, 703, source code that may be expressed in proper format such as object code that is capable of being loaded into a random access portion of the memories 606, 706 and executed by the processors 603, 703, or source code that may be interpreted by another executable program to generate instructions in a random access portion of the memories 606, 706 to be executed by the processors 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 606, 706 are defined herein as including both volatile and nonvolatile memory and data storage components. Volatile components are those that do not retain data values upon loss of power. Nonvolatile components are those that retain data upon a loss of power. Thus, the memories 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 603, 703 may represent multiple processors 603, 703 and each memory 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interfaces 609, 709 may comprise additional systems designed to coordinate this communication, including, for example, performing load balancing. The processors 603, 703 may be of electrical or of some other available construction.

Although the application store 112, the data store 115, the application server 118, the client applications 142, the data cache 148, the module cache 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-5 show the functionality and operation of an implementation of portions of the application server 118, the client application 142, the module cache 145, and the data cache 148. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603, 703 in a computer system or other system. The machine code may be converted from the source code, etc. If embodied in hardware, each block may represent a circuit or a number of interconnected circuits to implement the specified logical function(s).

Although the flowcharts of FIGS. 2-5 and 8 show a specific order of execution, it is understood that the order of execution may differ from that which is depicted. For example, the order of execution of two or more blocks may be scrambled relative to the order shown. Also, two or more blocks shown in succession in FIGS. 2-5 and 8 may be executed concurrently or with partial concurrence. Further, in some embodiments, one or more of the blocks shown in FIGS. 2-5 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application store 112, the data store 115, the application server 118, the client applications 142, the data cache 148, and the module cache 145, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    an application server executable by the at least one computing device, the application server comprising:
        logic that maintains an inventory of a plurality of networked applications, each one of the networked applications being segmented into a plurality of client-executable modules, wherein a distinct function of one of the networked applications corresponds to at least one client-executable module;
        logic that sends a first one of the client-executable modules to a client over a network
        logic that maintains user application data associated with each one of the networked applications;
        logic that sends at least a portion of the user application data over the network to the client; and
        logic that obtains an update to the user application data over the network from the first one of the client-executable modules,
    wherein each one of the client-executable modules is configured such that, when the one of the client-executable modules has been stored by a cache of the client, the distinct function corresponding to the one of the client-executable modules remains usable in the client during a loss of connectivity to the at least one computing device,
    wherein the application server sends the first one of the client-executable modules to the client over the network in response to a first request over the network for the first one of the client-executable modules from the corresponding one of the networked applications,
    wherein the first one of the client-executable modules is configured to initiate a second request for a second one of the client-executable modules when a distinct function corresponding to the second one of the client-executable modules is to be used.

2. The system of claim 1, wherein the application server further comprises:
    logic that sends a second one of the client-executable modules to the client over the network; and
    wherein the first one of the client-executable modules and the second one of the client-executable modules correspond to distinct functions.

3. The system of claim 1, wherein the application server further comprises:
    logic that pre-fetches at least one of: user application data associated with each one of the networked applications and user application data associated with at least one of the client-executable modules, basing on an input obtained via a user interface of the client.

4. A method, comprising:
    maintaining, by a computing device, a module cache;
    receiving, by a computing device, a user invocation of a first function associated with a networked application, the networked application being segmented into a plurality of modules, each of the modules implementing a distinct function for the networked application;
    determining, by the computing device, whether a first one of the modules is in a module cache, the first one of the modules implementing the first function;
    receiving, by the computing device, the first one of the modules from an application server over a network in response to determining that the first one of the modules is not in the module cache;
    executing, by the computing device, the first one of the modules to provide the first function;
    receiving, by the computing device, user application data from the application server over the network; and
    sending, by the computing device, an update to the user application data to the application server over the network, the update being generated by the first one of the modules,
    wherein each one of the modules is configured such that the distinct function provided by the one of the modules remains usable during a loss of connectivity of the computing device to the application server
    wherein the application server sends the first one of the modules to the computing device over the network in response to a first request over the network for the first one of the modules from the networked application,
    wherein the first one of the modules is configured to initiate a second request for a second one of the modules when a second function corresponding to the second one of the modules is to be used.

5. The method of claim 4, further comprising:
    responsive to determining that the first one of the modules is in the module cache:
    determining, by the computing device, whether an updated version of the first one of the modules is available; and
    obtaining, by the computing device, the updated version of the first one of the modules from the application server over the network in response to determining that the updated version of the first one of the modules is available.

6. The method of claim 4, further comprising:
    receiving, by the computing device, a user invocation of a second function associated with the networked application;
    determining, by the computing device, whether a second one of the modules is in the module cache, the second one of the modules implementing the second function;
    receiving, by the computing device, the second one of the modules from the application server over the network in response to determining that the second one of the modules is not in the module cache; and
    executing, by the computing device, the second one of the modules to provide the second function,
    wherein the first function and the second function are distinct functions.

7. The method of claim 4, further comprising selecting, by the computing device, at least another module out of a plurality of modules stored in the module cache to be removed from the module cache, wherein a particular set of modules in the module cache are indicated to remain in the module cache.

8. The method of claim 7, wherein the at least another module is associated with another networked application.

9. The method of claim 4, further comprising pre-fetching at least one of: user application data associated with each one of the networked application and user application data associated with at least one of the modules, basing on an input obtained via a user interface of the computing device.

10. A non-transitory computer-readable medium embodying a program executable by a computing device, the program comprising:
  code that generates a user interface facilitating user selection from a plurality of networked applications hosted by an application server;
  code that obtains a user selection of one of the networked applications, wherein the one of the networked applications is segmented into a plurality of client-executable modules that each provides a distinct function;
  code that determines whether a first set of the client-executable modules which are necessary to provide an initial function for the one of the networked applications are present in a client module cache;
  code that obtains a first one of the first set of the client-executable modules from the application server in response to determining that the first one of the first set of the client-executable modules is not present in the client module cache;
  code that loads a second one of the first set of the client-executable modules from the client module cache in response to determining that the second one of the first set of the client-executable modules is present in the client module cache;
  code that obtains user application data from the application server;
  code that sends an update to the user application data to the application server, the update being generated by the first set of the client-executable modules; and
  code that executes the first set of the client-executable modules to provide the initial function, wherein the initial function is provided during a loss of connectivity of the computing device to the application server
  wherein the application server sends the first one of the modules to the computing device over the network in response to a first request over the network for the first one of the modules from the networked application,
  wherein the first one of the modules is configured to initiate a second request for a second one of the modules when a second function corresponding to the second one of the modules is to be used.

11. A system, comprising:
  a computing device; and
  a client executable by the computing device, the client comprising:
  logic that obtains a user selection of one of a plurality of networked applications hosted by an application server, wherein the one of the networked applications is segmented into a plurality of client-executable modules that each provides a distinct function;
  logic that determines a first set of the client-executable modules for providing an initial function for the one of the networked applications;
  logic that receives the first set of the client-executable modules from the application server based on whether the first set of the client-executable modules is available in a module cache in the computing device;
  logic that executes the first set of the client-executable modules to provide the initial function;
  logic that receives user application data from the application server over the network based on whether the user application data is available in a data cache in the computing device; and
  logic that sends an update to the user application data to the application server, the update being generated by at least one of the client-executable modules
  wherein the application server sends the first set of the client-executable modules to the client in response to a first request for the first set of the client-executable modules from the one of the networked applications,
  wherein the first set of the client-executable modules is configured to initiate a second request for a second set of the client-executable modules when an additional function corresponding to the second set of the client-executable modules is to be used.

12. The system of claim 11, wherein the client further comprises:
  logic that determines a second set of the client-executable modules for providing an additional function for the one of the networked applications;
  logic that receives the second set of the client-executable modules from the application server based on whether the second set is available in the module cache in the computing device; and
  logic that executes the second set of the client-executable modules to provide the additional function,
  wherein the initial function and the additional function are distinct functions.

13. The system of claim 1, wherein the first one of the client-executable modules to be sent to the client over the network is determined by the application server, and subsequent modules to be sent to the client over the network are also determined by the application server.

14. The system of claim 1, wherein the application server provides a structure of the client-executable modules, and the application server sends the first one of the client-executable modules to the client over the network in response to a first request over the network for the first one of the client-executable modules from the client.

15. The method of claim 4, wherein certain types of user application data are specified such that updates to the certain types of user application data are not sent by the computing device to the application server over the network.

16. The method of claim 4, wherein the first one of the modules to be received by the computing device over the network is determined by the application server, and subsequent modules to be received by the computing device over the network are also determined by the application server.

17. The method of claim 4, wherein the application server provides a structure of the modules, and the application server sends the first one of the modules to the computing device over the network in response to a first request over the network for the first one of the modules from the computing device.

18. The non-transitory computer-readable medium of claim 10, further comprising code that specifies that updates to certain types of user application data are not sent to the application server.

19. The system of claim 11, further comprising logic that specifies that updates to certain types of user application data are not sent to the application server.

20. The system of claim 11, wherein the client further comprises logic that selects at least another client-executable module out of the plurality of client-executable modules stored in the module cache to be removed from the module cache, wherein a particular set of client-executable modules in the module cache are indicated to remain in the module cache.

21. The system of claim 11, wherein the first set of the client-executable modules to be received by the client is determined by the application server, and subsequent modules to be received by the client are also determined by the application server.

22. The system of claim 11, wherein the application server provides a structure of the client-executable modules, and the application server sends the first set of the client-executable modules to the client in response to a first request for the first set of the client-executable modules from the client.

* * * * *